United States Patent [19]
Umemoto et al.

[11] Patent Number: 4,791,495
[45] Date of Patent: Dec. 13, 1988

[54] DIGITAL SIGNAL RECORDING AND REPRODUCING SYSTEM HAVING AN INTERFACE FOR DUBBING A COLOR TELEVISION SIGNAL IN THE COMPONENT FORM

[75] Inventors: Masuo Umemoto, Tokyo; Yoshizumi Eto, Sagamihara; Shinichi Miyazaki; Hidehiro Kanada, both of Kodaira; Hitoshi Katayama, Nerima; Yuichi Michikawa, Kasama, all of Japan

[73] Assignees: Hitachi Denshi Kabushiki Kaisha; Hitachi Ltd., both of Tokyo, Japan

[21] Appl. No.: 862,639

[22] Filed: May 13, 1986

[30] Foreign Application Priority Data

May 13, 1985 [JP] Japan ................................ 60-99586

[51] Int. Cl.[4] .............................................. H04N 9/79
[52] U.S. Cl. ...................................... 358/310; 360/22; 360/24; 360/32; 360/33.1; 360/39; 360/48
[58] Field of Search ...................... 358/310, 335, 339; 360/22, 23, 24, 29, 32, 33.1, 39, 40, 48

[56] References Cited

U.S. PATENT DOCUMENTS 4,389,681  6/1983  Tanaka et al. ...................... 360/27
4,392,162  7/1983  Yamamoto ........................ 360/22 X Primary Examiner—Robert L. Richardson
Attorney, Agent, or Firm—Antonelli, Terry & Wands

[57] ABSTRACT

A digital recording and reproducing system wherein luminance signals digitized and converted into the low speed signals and chrominance signals digitized at the time of recording are distributed among a plural number of channels and the signals of the plural number of channels are recorded respectively on a recording medium. At the time of the reproduction, the signals of the plural number of the channels are reproduced respectively from the recording medium and combined to form the luminance signals and the chrominance signals respectively. The luminance signals in the combined signal are converted into a high speed signal and output terminals for outputting dubbing signals from the system for dubbing the signals are led. The output side of a low speed-to-high speed converter and a channel combination circuit.

6 Claims, 3 Drawing Sheets

FIG. 2A

| | | | | | | | | | | | | | | | | | | | |
|---|---|---|---|---|---|---|---|---|---|---|---|---|---|---|---|---|---|---|---|
| 50/57 { | Y | $Y_1$ | $Y_2$ | $Y_3$ | $Y_4$ | $Y_5$ | $Y_6$ | $Y_7$ | $Y_8$ | $Y_9$ | $Y_{10}$ | $Y_{11}$ | $Y_{12}$ | $Y_{13}$ | $Y_{14}$ | $Y_{15}$ | $Y_{16}$ | $Y_{17}$ | $Y_{18}$ |
| | $C_W$ | $C_{W1}$ | | $C_{W2}$ | | $C_{W3}$ | | $C_{W4}$ | | $C_{W5}$ | | $C_{W6}$ | | | | | | | |
| | $C_N$ | $C_{N1}$ | | $C_{N2}$ | | $C_{N3}$ | | $C_{N4}$ | | $C_{N5}$ | | $C_{N6}$ | | | | | | | |

FIG. 2B

| | | | | | | | |
|---|---|---|---|---|---|---|---|
| 51/56 { | $Y_I$ | $Y_1$ | $Y_4$ | $Y_7$ | $Y_{10}$ | $Y_{13}$ | $Y_{16}$ |
| | $Y_{II}$ | $Y_2$ | $Y_5$ | $Y_8$ | $Y_{11}$ | $Y_{14}$ | $Y_{17}$ |
| | $Y_{III}$ | $Y_3$ | $Y_6$ | $Y_9$ | $Y_{12}$ | $Y_{15}$ | $Y_{18}$ |
| | $C_W$ | $C_{W1}$ | $C_{W2}$ | $C_{W3}$ | $C_{W4}$ | $C_{W5}$ | $C_{W6}$ |
| | $C_N$ | $C_{N1}$ | $C_{N2}$ | $C_{N3}$ | $C_{N4}$ | $C_{N5}$ | $C_{N6}$ |

FIG. 2C

| | | | | | | | |
|---|---|---|---|---|---|---|---|
| 52/55 { | $C_1$ | $Y_1$ | $C_{N2}$ | $C_{W3}$ | $Y_{12}$ | $Y_{14}$ | $Y_{16}$ |
| | $C_2$ | $Y_2$ | $Y_4$ | $C_{N3}$ | $C_{W4}$ | $Y_{15}$ | $Y_{17}$ |
| | $C_3$ | $Y_3$ | $Y_5$ | $Y_7$ | $C_{N4}$ | $C_{W5}$ | $Y_{18}$ |
| | $C_4$ | $C_{W1}$ | $Y_6$ | $Y_8$ | $Y_{10}$ | $C_{N5}$ | $C_{W6}$ |
| | $C_5$ | $C_{N1}$ | $C_{W2}$ | $Y_9$ | $Y_{11}$ | $Y_{13}$ | $C_{N6}$ |

DIGITAL SIGNAL RECORDING AND REPRODUCING SYSTEM HAVING AN INTERFACE FOR DUBBING A COLOR TELEVISION SIGNAL IN THE COMPONENT FORM

BACKGROUND OF THE INVENTION

The present invention relates to a system designed suitably for the digital dubbing of a reproduced signal which constitutes a part of a system designed for the conversion of a video signal into a digital signal and the recording of the digital signal on a plural number of channels by magnetic or optical recording.

As an example of a system for converting the video signal into a digital signal and recording the digital signal on a recording medium by magnetic or optical apparatus is a digital video tape recorder. It is extremely difficult for the code obtained from the video signal to be recorded, for example, by a single magnetic head, since such a code constitutes high-speed data of 100 Mb/second or higher. In order to cope with this problem, a technique which enables the code to be distributed for a plural number of channels and recorded simultaneously using a plural number of magnetic heads is used.

As for a method of distribution of the video code, there are the following three methods as have been proposed by Hirano et al. in the paper entitled "A Study on Variable Speed Rproduction of the Digital VTR" in SMPTE Journal, Vol. 92, No. 6 (June, 1983) pp. 636–641. The following are three methods for the distribution of a video code into three channels A, B and C.

(i) The high bits of each picture element are assigned to channel A, the medium bits to channel B and the low bits to channel C.

(ii) Each picture element is assigned to the channels A, B, C, A, B, C . . . .

(iii) The picture elements in left area of the picture are assigned to channel A, the picture elements in the central area to channel B and the picture elements in right area to channel C.

In each case of the aforementioned video code distribution methods, however, it is intended that the distribution-by-channel of what is called the composite signal consisting of a luminance signal and the chrominance signal, which have undergone processing for frequency division multiplexing, to be just like a NTSC signal.

On the other hand, for recording of a high-quality picture, it is considered preferable for the luminance signal and the chrominance signal to be recorded separately instead of being processed for frequency division multiplexing. As for what is called the component signal such as that discussed above, there is no previous publicly known example for optimization of the distribution by channel. Consequently, there is no previous publicly known method as to the digital dubbing of the reproduced signal relating to the method of video code distribution.

SUMMARY OF THE INVENTION

An object of the present invention is to provide a dubbing system suited for digital dubbing of a reproduced signal as part of a system designed for recording a luminance signal and a chrominance signal, which have been converted into digital codes separately, by distributing the signals among a plural number of channels.

As for a system designed for recording the luminance signal and the chrominance signal, which have been converted into digital codes separately, by distributing the codes among a plural number of channels, has already been proposed in the Japanese patent application No. 194721/1984 and the corresponding U.S. patent application Ser. No. 758,702 now U.S. Pat. No. 4,737,863. In the case of the system relating to the present invention, the number of channels for the recording of a signal is larger than the number of the color video signals (luminance signal and chrominance signal), and this is the point of the present invention. According to the present invention, for digital dubbing by a system characterized by the method of the present invention, an output terminal for the dubbing signals is provided for the state where the luminance signal and the chrominance signal are converted into digital codes separately. When the dubbing signals are to be obtained from the digital signals after the channel distribution and before channel combination, the connection lines and the change-over switches which are as many as the number of the channels are needed, and this causes the problems such as the complexity of the system and the resultant fall of the reliability. According to the present invention, the dubbing signals are taken out after the channel combination, so that, even when the number of channels is increased, the required number of connection lines and change-over switches for dubbing are only as many as those of the original video signals (luminance signal and chrominance signal), whereby not only the reliability of the system can be improved but also the number of connection lines and change-over switches for dubbing can be minimized.

BRIEF DESCRIPTION OF THE DRAWINGS

In the accompanying drawings,

FIGS. 2A, 2B and 2C show the states of the signal at different stages of the embodiment shown in FIG. 1, respectively.

DETAILED DESCRIPTION OF PREFERRED EMBODIMENTS

Figure 1:
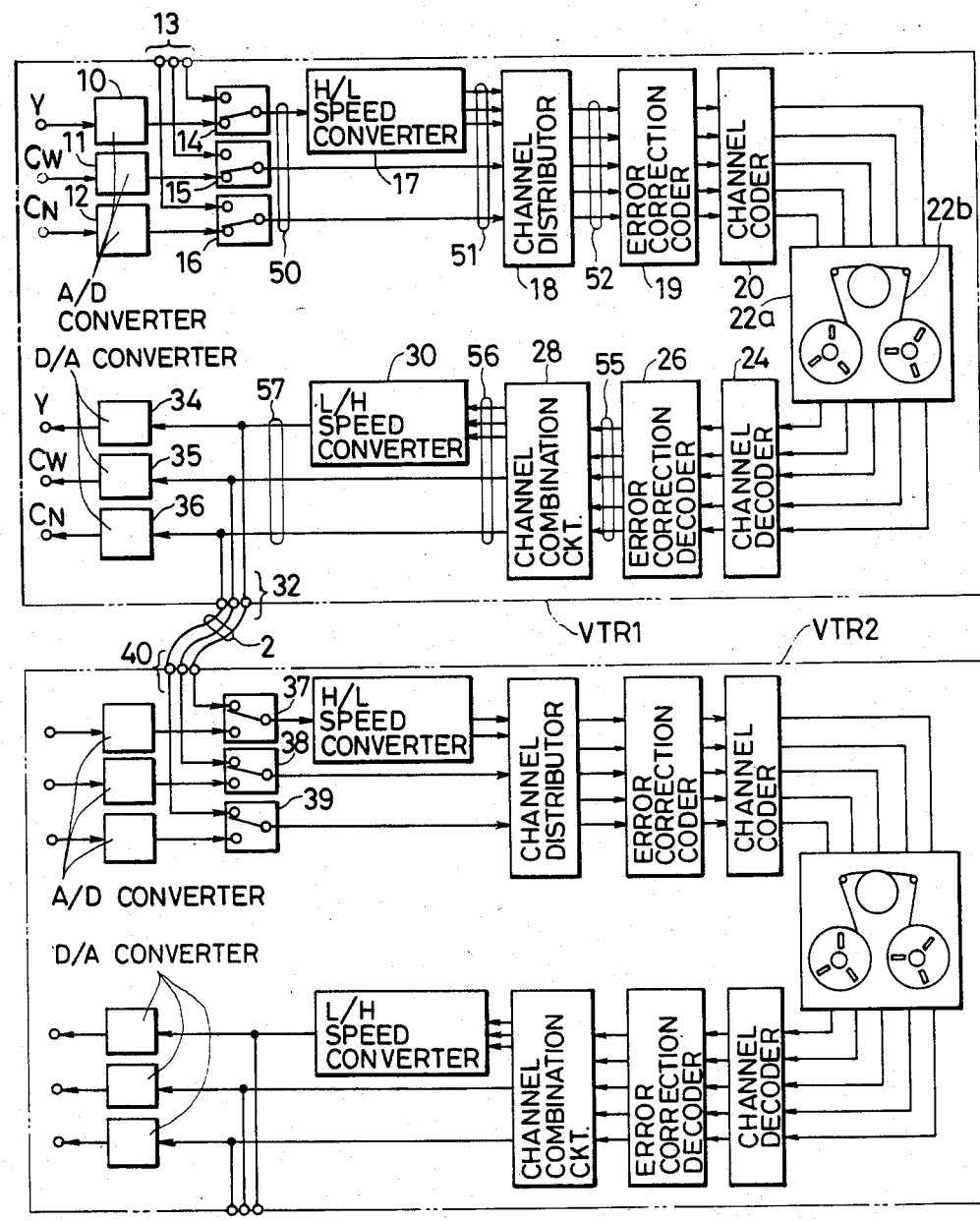
FIG. 1 is a block diagram showing one of the embodiments of the present invention.

FIG. 1 shows one of the embodiments of the present invention wherein the present invention is applied to a digital video tape recorder.

In the case where the signal of the video tape recorder (VTR) 1 is to be dubbed into the video tape recorder (VTR) 2 as shown in FIG. 1, the two video tape recorders are connected to each other through the connection line 2 for the dubbing. Before explaining the dubbing system, the composition and operation of the video tape recorders shown in FIG. 1 will be explained.

In the video tape recorder 1, the analog-to-digital converters 10, 11 and 12 respectively receive the video signals to be recorded, that is, the luminance signal Y and two chrominance signals $C_W$ and $C_N$, convert these signals into digital signals, and output the digital signals to the switches 14, 15 and 16 respectively. There are provided two input terminals to each of switches 14, 15 and 16, and one of input terminals is connected to the analog-to-digital converters 10, 11 and 12 while the other is connected to one of the input terminals 13 for a dubbing signal. The output terminal of the switch 14 is connected to a high speed-to-low speed converter 17. The high speed-to-low speed converter 17 converts the high speed of the luminance signal Y into a speed equal to the speeds of the chrominance signals $C_W$ and $C_N$. In the case shown in FIG. 1, the speed of the luminance signal is reduced to one third to obtain three low speed luminance signals. The channel distributor 18 mixes the signals from the converter 17 and the switches 15 and 16, and distributes the mixed signals among a plural number of channels (Five channels are shown in FIG. 1). The mixing and the distribution of the signals will be explained in detail in FIG. 2. An error correction coder 19 adds error correction codes to the signals from the channel distributor 18. The signals with the error correction codes added are supplied to the recording and reproducting unit 22a (the magnetic tape transport system and the recording and reproducing heads) by way of the channel coder 20, whereby the video signal is recorded in the recording medium 22b.

The recorded video signal is reproduced as follows; the signals reproduced from the recording medium 22b through a channel decoder 24 are inputted to an error correction decoder 26, and the signals whose code errors are corrected are supplied to a channel combination circuit 28. The channel combination circuit 28 separates the luminance signal and the chrominance signal which have been mixed and distributed among the plural number of the channels. A low speed-to-high speed converter 30 converts the luminance signal, which has been converted into the low speed signals, into the original high speed signal. The output side of the low speed-to-high speed converter 30 and the channel combination circuit 28 are connected to dubbing signal output terminals 32. Digital-to-analog converters 34, 35 and 36 respectively convert the luminance signal from the low speed-to-high speed converter 30 and the chrominance signals from the channel combination circuit 28 into analog signals respectively, and reproduce the luminance signal Y and the chrominance signals $C_W$ and $C_N$. The explanation for the composition of the video tape recorder 2 shown in FIG. 1 is omitted here, since the video tape recorder has the same composition as that of aforementioned video tape recorder 1.

FIGS. 2A, 2B and 2C respectively show the states of the digital signals at different stages shown in FIG. 1. FIG. 2A shows the states of the signals at the input side 50 of the high speed-to-low speed converter 17 and of the channel distributor 18 in FIG. 1, and similarly the states of the signals at the output side 57 of the low speed-to-high speed converter 30 and of the channel combination circuit 28. FIG. 2B shows the states of the signals at the input side 51 of the channel distributor 18 and the state of the signal at the output side 56 of the channel combination circuit 28. FIG. 2C shows the states of the signals at the output side 52 of the channel distributor 18 and the states of the signals at the input side 55 of the channel combination circuit 28.

The high speed-to-low speed converter 17 converts the inputted luminance signal Y (see FIG. 2A) into the luminance signals $Y_I$, $Y_{II}$ and $Y_{III}$ whose speeds are equal to those of the chrominance signals $C_W$ and $C_N$ (see FIG. 2B). As shown in FIG. 2A, the speed of the chrominance signal is lower than that of the luminance signal, since the signal band of the chrominance signal is good enough visually even when it is one third of signal band of the luminance signal. The speed of the luminance signal needs to be equalized to that of the chrominance signal in order to mix these signals and distribute the mixed signals. The channel distributor 18 cyclically distributes the luminance signals $Y_1$, $Y_2$, $Y_3$ ... and the chrominance signals $C_{W1}$, $C_{W2}$, $C_{W3}$ ... , $C_{N1}$, $C_{N2}$, $C_{N3}$ ... among the five channels C1 through C5, and mix them as shown in FIG. 2C. The signals are mixed and distributed among the different channels, since where the signals are left in the condition as is described in FIGS. 2A and 2B, the occurrence of dropout in any one of the channels will cause the deterioration of one specific signal such as, for example, the chrominance signal $C_W$. However, when the signals are left in the condition as is described in FIG. 2C, the deterioration will not concentrate on one specific signal even when the dropout has occurred in one of the channels, and distributed among all the signals, whereby the deterioration of the picture quality can be reduced. The signals which have undergone the processes of mixing and distribution are recorded in the recording medium 22b through the error correction coder 19 and the channel coder 20. For reproduction of the signals, the procedure which is inverse to the above-mentioned procedure has to be followed. That is, the signals reproduced from the medium 22b are inputted to the channel combination circuit 28 through the channel decoder 24 and the error correction decoder 26. The channel combination circuit 28 receives the input of the signals described in FIG. 2C, and separates the signals which have been mixed and distributed into the luminance signals $Y_I$ through $Y_{III}$ and the chrominance signals $C_W$ through $C_N$. The low speed-to-high speed converter 30 converts the luminance signals $Y_I$ through $Y_{III}$ into the high speed signal to obtain the original luminance signal Y as is shown in FIG. 2A. In this way, the luminance signal and the chrominance signals are reproduced from those converted individually into the digital codes.

The method of digital dubbing will be explained as follows. In the case where the dubbing is to be made into the video tape recorder 2 from the video tape recorder 1 as the source tape, the switches 37, 38 and 39 of the video tape recorder 2 are respectively connected to the dubbing signal input terminals 40. The dubbing signal input terminals 40 receive the inputs of the digitized luminance signal and chrominance signals through the dubbing signal output terminals 32 of the video tape recorder 1 and the connection lines 2, whereby the dubbing can be accomplished by a procedure similar to that of the recording operation of video tape recorder 1. The dubbing signals can also be taken from the input side 55 of the channel combination circuit 28, but this method requires not only the number of connection lines for the dubbing but also the number of change-over switches for the dubbing to be increased, and this is not advantageous not only for the reliability but also for the saving of the space and the manufacturing cost.

Figure 3:
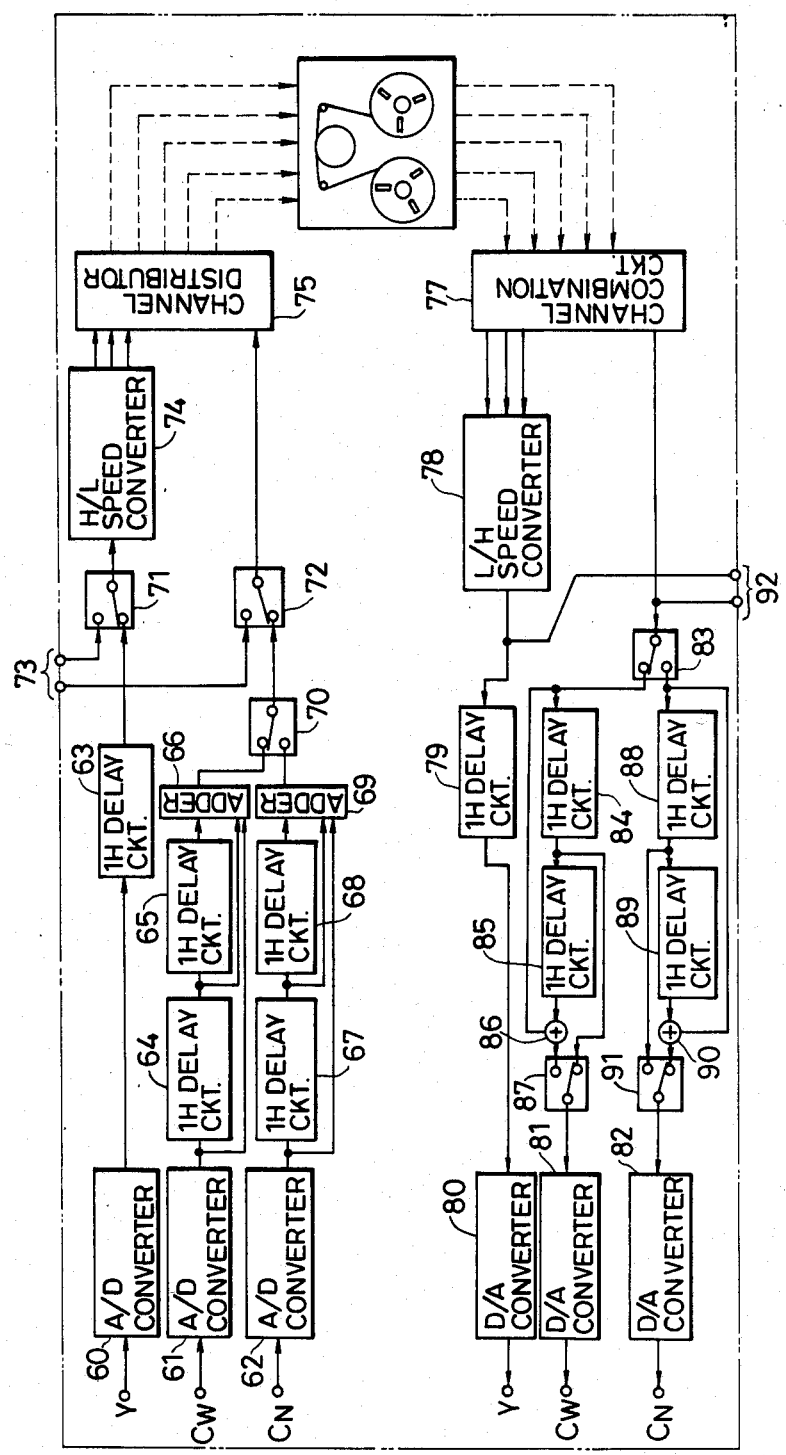
FIG. 3 is a block diagram showing another embodiment of the present invention.

FIG. 3 shows another embodiment of the present invention. This embodiment derives from the application of the present invention to the line sequential system designed for transmitting the chrominance signals $C_W$ and $C_N$ alternately for each scanning line.

In the system shown in FIG. 3, analog-to-digital converters 60, 61 and 62 respectively convert the analog luminance signal Y and the analog chrominance signals $C_W$ and $C_N$ into the digital signals. The line sequential system is designed to transmit the chrominance signals $C_W$ and $C_N$ alternately, so that, for the pre-processing, the low-pass filter is inserted in the vertical direction of the picture in order to prevent moiré from occurring in the vertical direction. The low-pass filter consists of two one-horizontal line (1H) delay circuits 64 and 65 and an adder including coefficient multiplier 66 as to the chrominance signal $C_W$, while the same consists of the two one-horizontal line delay circuits 67 and 68 and an adder including coefficient multiplier 69 as to the chrominance signal $C_N$. The chrominance signal is delayed for one scanning line due to the pre-processing for the line sequential system, so that the luminance signal Y is also delayed by inserting one horizontal line delay circuit 63 in order to coincide the phases of the luminance signal and the chrominance signal with each other. The switch 71 receives the luminance signal from the delay circuit 63 or the dubbing signal input terminal 73, and outputs the signal to a channel distributor 75 through the high speed-to-low speed converter 74. On the other hand, the switch 70 is designed for switching between the chrominance signals $C_W$ and $C_N$ alternately for each scanning line. Another switch 72 receives the chrominance signal from the switch 70 or the dubbing signal input terminal 73, and outputs the signal to the channel distributor 75. The composition and the operations of the section between the channel distributor 75 and the channel combination circuit 77 are the same as that shown in FIG. 1 (indicated by broken line in the drawing), so that the illustration by drawing and the explanation of the section are omitted here.

On the reproduction side, the luminance signal outputted from the channel combination circuit 77 is supplied to the digital-to-analog converter 80 through low speed-to-high speed converter 78 and one horizontal line delay circuit 79. On the other hand, the chrominance signal outputted from the channel combination circuit 77 is supplied to switch 83 which makes the part of the signal to be supplied to the digital-to-analog converter 81 through one horizontal line delay circuits 84 and 85, adder 86 and switch 87 in order to reproduce the chrominance signal $C_W$, while the other part of the signal is supplied to digital-to-analog converter 82 through one horizontal line delay circuits 88 and 89, adder 90 and switch 91 in order to reproduce the chrominance signal $C_N$.

The explanation of the line sequential system itself is publicly known, so that its detailed explanation is omitted here.

In this embodiment, for the purpose of dubbing, the dubbing signal output terminals 92 are connected to the output side of the low speed-to-high speed converter 78 and the channel combination circuit 77, whereby only two connection lines for dubbing and only two change-over switches (71 and 72) will do, and thus the number of connection lines for dubbing and the number of change-over switches in this embodiment are smaller than those required in the case shown in FIG. 1, whereby the system of this embodiment is quite effective not only for the maintenance of the required reliability but also for the saving of space and the cost.

In the foregoing explanation of the embodiment of the present invention, the case where the magnetic tape of the video tape recorder is used as the recording medium is discussed, but the recording medium is not necessarily limited to magnetic tape in the embodiments of the present invention.

According to the present invention, the dubbing signal is obtained directly from the digitized luminance signal and the chrominance signal separately, so that the system as the embodiment of the present invention have advantages such as simple composition and high reliability.

What is claimed is:

1. A digital signal recording and reproducing system comprising:
    analog-to-digital conversion means for converting a plurality of analog signal components of an analog color television signal in component form to a plurality of digital signal components;
    recording means for recording said plurality of digital signal components on a plurality of channels of a recording medium;
    reproducing means for reproducing said plurality of digital signal components from said plurality of channels of said recording medium;
    digital-to-analog conversion means for converting said plurality of reproduced digital signal components to analog signal components of an analog color television signal in component form; and
    interface means for outputting said reproduced digital signal components corresponding to said analog signal components of said analog color television signal in component form, as signals for dubbing.

2. A digital signal recording and reproducing system comprising:
    analog-to-digital conversion means for converting a plurality of analog signal components of an analog color television signal in component form to a plurality of digital signal components;
    recording means for recording said plurality of digital signal components on a plurality of channels of a recording medium;
    reproducing means for reproducing said plurality of digital signal components from said plurality of channels of said recording medium;
    digital-to-analog conversion means for converting said reproduced plurality of digital signal components to analog signal components of an analog color television signal in component form; and
    interface means for inputting digital signal components corresponding to analog signal components of an analog color television signal in component form, as signals to be dubbed in a recording medium by said recording means.

3. A digital signal recording and reproducing system comprising:
    analog-to-digital conversion means for converting a plurality of analog signal components of an analog color television signal in component form to a plurality of digital signal components;
    recording means for recording said plurality of digital signal components on a plurality of channels of a recording medium;
    reproducing means for reproducing said plurality of digital signal components from said plurality of channels of said recording medium;
    digital-to-analog conversion means for converting said plurality of reproduced digital signal components to analog signal components of an analog color television signal in component form;
    first interface means for outputting said digital signal components corresponding to said analog signal components of an analog color television signal in composite form, as signals for dubbing; and
    second interface means for inputting digital signal components corresponding to analog signal components of an analog color television signal in component form, as signals to be dubbed in a recording medium by said recording means.

4. A digital signal recording and reproducing system according to claim 3, wherein said system further comprises:
   first signal conversion means for converting at least one of said digital signal components to a plurality of digital recording signals wherein a frequency bandwidth of each digital recording signal is narrower than that of at least one of said digital signal components; and
   second signal conversion means for converting said plurality of digital recording signals to at least one of said reproduced digital signal components.

5. A digital signal recording and reproducing system according to claim 2, wherein said system further comprises:
   first signal conversion means for converting at least one of said digital signal components to a plurality of digital recording signals, wherein a frequency bandwidth of each digital recording signal is narrower than that of at least one of said digital signal components; and
   second signal conversion means for converting said plurality of digital recording signals to at least one of said reproduced digital signal components.

6. A digital signal recording and reproducing system according to claim 3, wherein said system further comprises:
   first signal-conversion means for converting at least one of said digital signal components to a plurality of digital recording signals, wherein a frequency bandwidth of each digital recording signal is narrower than that of at least one of said digital signal components; and
   second signal conversion means for converting said plurality of digital recording signals to at least one of said reproduced digital signal components.

* * * * *